United States Patent [19]
Abshire

[11] Patent Number: 4,850,712
[45] Date of Patent: Jul. 25, 1989

[54] METHOD AND SYSTEM FOR DETERMINING SURFACE PROFILE INFORMATION

[75] Inventor: James B. Abshire, Laurel, Md.

[73] Assignee: Caterpillar Inc., Peoria, Ill.

[21] Appl. No.: 150,603

[22] Filed: Feb. 1, 1988

[51] Int. Cl.$^4$ .............................................. G01B 11/24
[52] U.S. Cl. ...................................... 356/376; 250/205
[58] Field of Search ........................ 356/373, 375, 376; 250/205; 219/124.34

[56] References Cited

U.S. PATENT DOCUMENTS

| | | | |
|---|---|---|---|
| 3,450,934 | 6/1969 | Frenk | 315/10 |
| 3,601,613 | 8/1971 | Hock | 250/205 |
| 3,800,149 | 3/1974 | Lang | 205/205 |
| 4,158,507 | 6/1979 | Himmel | 356/376 |
| 4,299,491 | 11/1981 | Waters et al. | 356/376 |
| 4,336,997 | 6/1982 | Ross et al. | 356/4 |
| 4,349,277 | 9/1982 | Mundy et al. | 356/376 |
| 4,355,904 | 10/1982 | Balasubramanian | 356/376 |
| 4,493,968 | 1/1985 | Brown | 219/124.34 |
| 4,571,712 | 2/1986 | Romano et al. | 369/44 |
| 4,621,351 | 11/1986 | Baer et al. | 369/44 |
| 4,634,879 | 1/1987 | Penney | 250/560 |
| 4,707,838 | 11/1987 | Reule et al. | 250/205 X |

FOREIGN PATENT DOCUMENTS

WO86/02452 4/1986 PCT Int'l Appl. .

OTHER PUBLICATIONS

*Welding sensor uses structured light and 2D photocell,* Sensor Review, vol. 2, No. 1, Jan., 1982, pp. 26–29.
PCT International Search Report (PCT/US 88/00902), *Fiber Optic Seam Tracking Apparatus* published Apr. 24, 1986.

*Primary Examiner*—F. L. Evans
*Attorney, Agent, or Firm*—Michael G. Fletcher; Stephen L. Noe

[57] ABSTRACT

A system determines the surface profile of an object. Systems of this kind are used in industrial robots, such as automatic welders. The severe operating environment requires a vision system with noise immunity along with accuracy. A beam splitter enables the use of discrete optical detectors which eliminate many problems inherent with previously used detectors, such as diode arrays and TV cameras. Additionally, an automatic gain control alters the intensity of a generated optical beam in response to the reflectivity of the surface. These features increase the accuracy and noise immunity of an optical vision system for use in sever industrial applications.

29 Claims, 5 Drawing Sheets

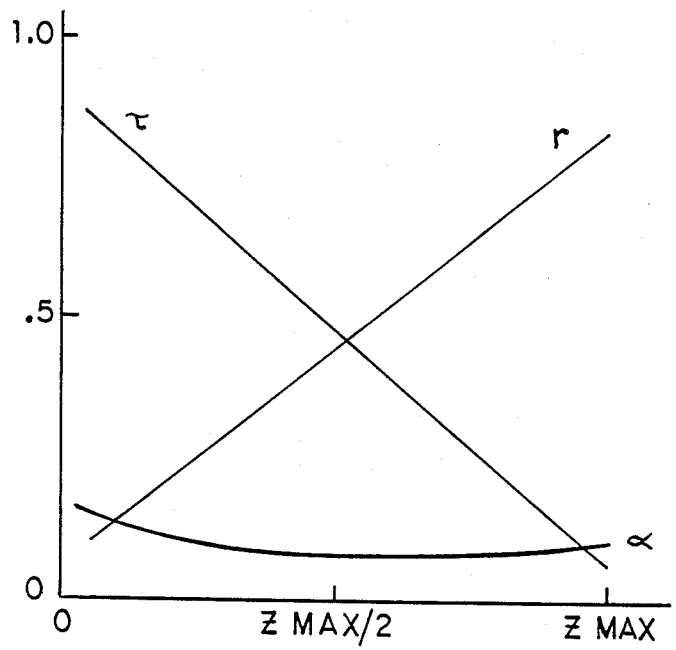
Fig-3-
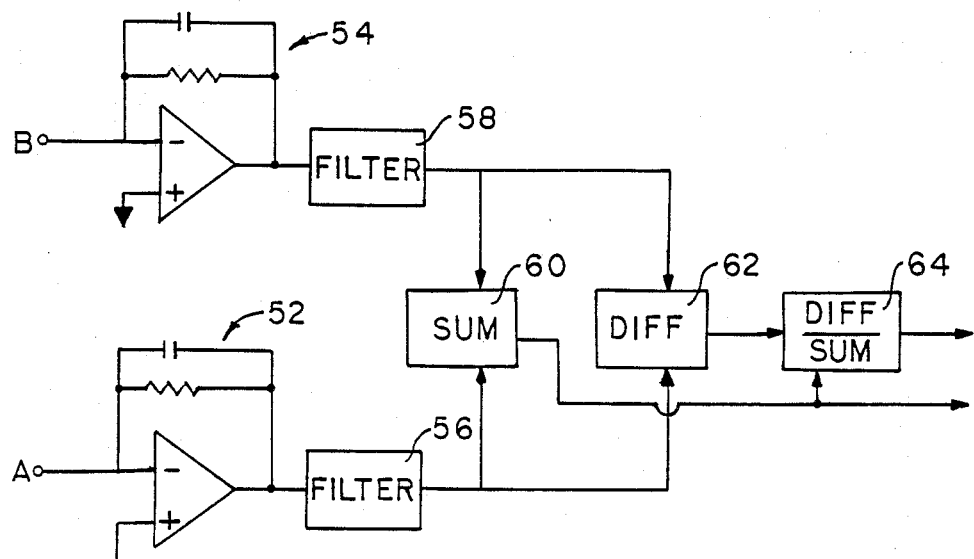
Fig-4-

METHOD AND SYSTEM FOR DETERMINING SURFACE PROFILE INFORMATION

DESCRIPTION

1. Technical Field

This invention relates generally to an optical sensor system and more particularly to an optical sensor system for determining the profile of a surface.

2. Background Art

Optical sensors operate in sundry diverse industrial applications. Very simple applications include burglar alarms, where the mere presence or absence of light conveys information. More complex applications include vision sensors used in robotic apparatuses. For instance, robotic welders employ optical sensors to determine a variety of parameters about a weld surface. By determining the profile of the weld groove, the area of the groove, and the changes in curvature of the weld surface, robotic welders produce accurate welds. Of course the accuracy of such robotic welders relies on the accuracy with which the associated optical system measures the parameters of the weld surface. Quick, reliable, and continuous measurement of these parameters produces quality welds.

Optical sensor systems assume various forms. A beam of radiant energy, usually produced by a laser, is scanned across the surface of a work piece. An optical sensor, such as a TV camera, or an array of photodiode detectors or charge-coupled devices (CCD), receives light reflected from the surface. The optical sensor is typically mounted at a known angle with respect to the beam or the workpiece. A computer or other associated circuitry receives information from the optical sensor and determines the contour of the surface by methods of triangulation.

Information loss in optical sensors poses problems regarding system accuracy. Preferably only the light associated with the beam is processed to produce surface information. In this regard, present optical sensors suffer in severe applications. In welding, for example, an intense light from the weld arc impinges on the optical sensors. Lasers and other optical sources capable of overcoming such intense light tend to be expensive, prodigious, and powerful. Modulated lasers, in association with special filtering, partially overcome excessive ambient light. However, other factors, such as changes in surface reflectivity, result in poor scanning and signal dropouts.

Moreover, even if the optical sensors can differentiate between the beam and superfluous ambient light, they may be inherently prone to saturation or poor sensitivity. Intense light striking the pixels of TV cameras and charge-coupled devices saturate them quite easily. Obviously, a saturated sensing element cannot produce accurate information. Conversely, detector arrays contain finite spaces between the array elements. Light striking the spaces on the surface of an array is not detected by the elements of the array, and therefore is not processed. Inherent disadvantages of these optical sensors result in uncertain surface information.

Slow response time associated with some optical sensors also limits their effectiveness in real time applications. Pixel processors must process the output from all pixels in a detector array before the position of an optical spot can be determined. Since almost all arrays are read out in a serial fashion, readout time alone is a serious drawback. As the resolution is increased, more pixels must be processed. For fast scanning times, readout time can easily limit the speed of the entire sensor. Furthermore, all array detectors have a limiting noise contributed by the readout circuitry itself. For many detector arrays, this readout noise limits their sensitivity to values many times worse than that of an isolated single detector. For high speed applications, this is a significant drawback. Additionally, for charge-coupled devices, the processors may be required to integrate the charge on each pixel, which is a slow process.

The present invention is directed to overcoming one or more of the problems as set forth above.

DISCLOSURE OF THE INVENTION

In accordance with one aspect of the present invention a system determines profile information from the surface of an object. An optical beam source generates an optical beam for application to the surface. A means receives a reflected optical beam from the surface, and applies the reflected optical beam onto an image plane. A variable beam splitter is adapted to receive the reflected optical beam from the image plane and pass a first portion of the reflected optical beam and reflect a second portion of the reflected optical beam. Optical detecting means produces a first signal and a second signal in response to the magnitude of the first portion and the second portion of the reflected optical beam, respectively. Processing means determines the position of the reflected optical beam on the image plane in response to said first and second signals.

In accordance with another aspect of the present invention there is provided an automatic gain control for an optical system of a welding device. An optical beam source generates an optical beam for application to a surface. A means receives a reflected optical beam from the surface. Optical detecting means produces a feedback signal in response to the magnitude of the received reflected optical beam. A means compares the feedback signal and a preselected setpoint signal to produce a control signal. A means alters the magnitude of the generated optical beam in response to the control signal.

Industrial applications of optical sensors vary dramatically. For instance, in moderate, controlled environments, optical sensors function quite well without an overabundance of complexity. Harsh environments, by contrast, require optical sensors to possess considerable complexity for proper operation. Precision components, complex filtering, noise reduction techniques, and considerable engineering time improve the performance of an optical sensor in a demanding application. Automatic or robotic welding is one such application. Excessive noise, high ambient light, irregular work surfaces, and a hazy atmosphere tend to render useless all but the most sophisticated optical sensors. Many systems have attempted to overcome these problems. While some systems do function satisfactorily, many improvements can still be made.

In applications such as robotic welding, the speed with which an optical sensor determines the profile of the weld surface directly effects the speed and overall accuracy of the welding system. As previously discussed in the "Background Art" section, arrays and TV cameras lack speed and sensitivity. To enhance speed and sensitivity, the current apparatus uses only two discrete optical detectors. A beam splitter splits the received optical beam into two portions. A first portion is passed through to a first optical detector, and a second portion is reflected to a second optical detector. The portions vary continuously relative to the location at which the optical beam strikes the beam splitter. The outputs of the detectors indicate the position of the beam on the beam splitter. This positional information is related to the surface profile and can be used in associated control circuitry to control various weld parameters.

A modulated optical source overcomes poor ambient light and atmospheric conditions. A means modulates the power of the generated optical beam. The reflected optical beam also includes the modulation frequency that can be separated from background light by using electrical filters. Thus, the apparatus limits its sensitivity to ambient light by filtering out light which is not modulated at the proper frequency.

An automatic gain control circuit is used to overcome changes in work surface reflectivity. The automatic gain control adjusts the magnitude, i.e., output power, of the generated optical beam in response to the reflectivity of the surface. The magnitude of the reflected optical beam is at least partially indicative of the reflectivity of the surface. So by measuring the magnitude of the reflected optical beam, the surface reflectivity is determined. When the surface reflectivity is low, the magnitude of the generated optical beam is increased; when the surface reflectivity is high, the magnitude of the generated optical beam is decreased. By adjusting the output power of the optical source, the system receives a substantially constant amplitude of reflected radiation. This improves the signal to noise ratio of the system dramatically.

BRIEF DESCRIPTION OF THE DRAWINGS

FIG. 3 illustrates typical reflection/transmission properties of a beam splitter;

FIG. 4 is a functional block diagram of circuitry associated with the optical sensor;

BEST MODE FOR CARRYING OUT THE INVENTION

Figure 1:
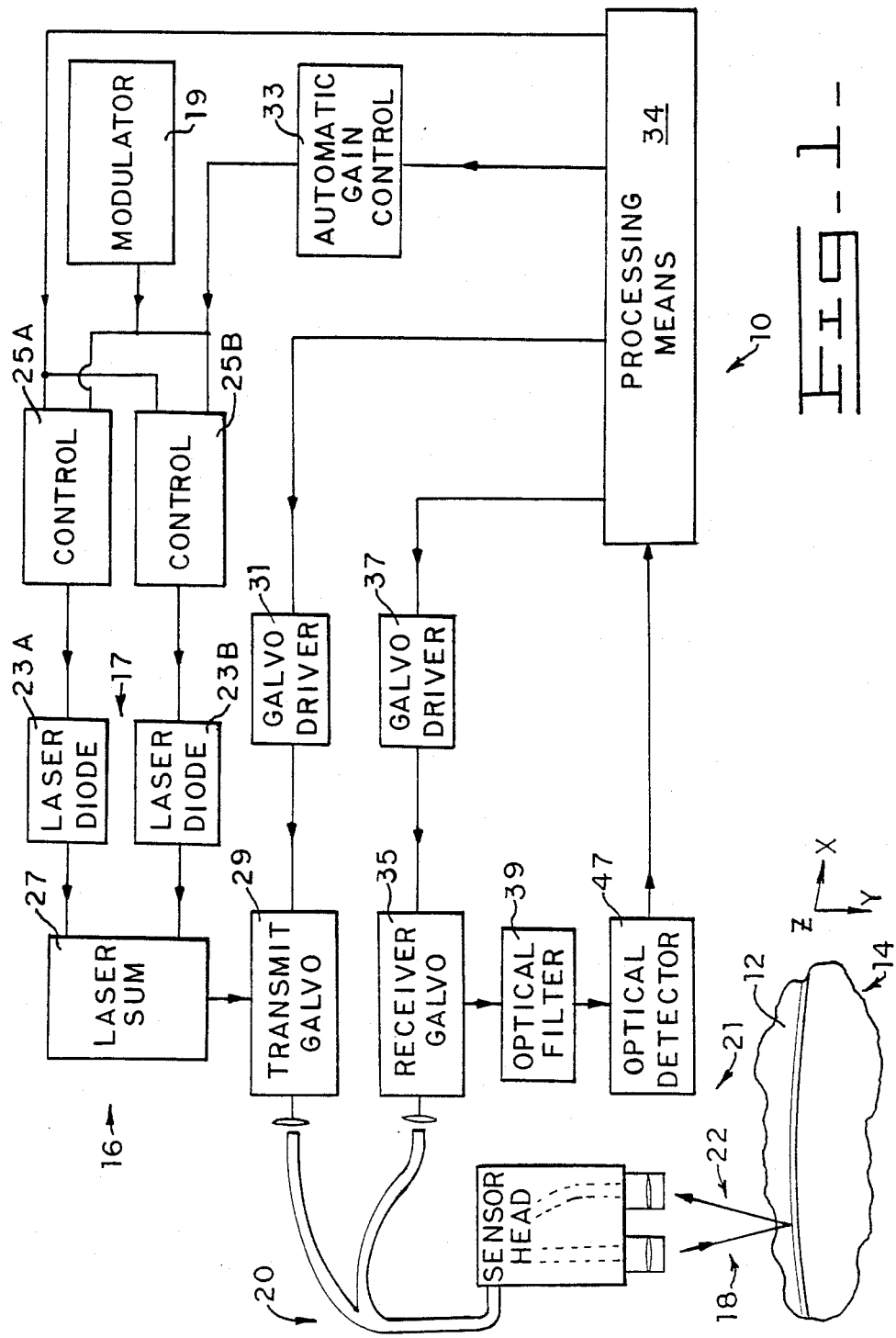
FIG. 1 is a functional block diagram of an optical control system.

Referring to the drawings, FIG. 1 is a functional block diagram of an optical control system 10 for determining profile information from the surface 12 of an object 14. An optical beam source 16, typically a laser 17, generates and optical beam 18 for application to the surface 12. Preferably, the generated optical beam 18 is modulated by a modulating means 19. A means 20 receives a reflected optical beam 22 from the surface 12. The receiving means 20 transmits the reflected optical beam 22 to an optical sensing means 21. The optical sensing means 21 delivers a first and second electrical signal in response to the reflected optical beam 22. A processing means 34 determines the profile of the surface 12 in response to the respective magnitudes of successive first and second signals. Feedback circuitry, including an automatic gain control 33, modulation means 19, laser diodes 23A, 23B, and associated diode controllers 25A, 25B, controls the magnitude and modulation frequency of the generated optical beam 18.

The laser 17 includes two laser diodes 23A, 23B. The laser diodes 23A, 23B are controlled by respective diode controllers 25A, 25B. The diode controllers 25A, 25B commonly control the output power of the laser diodes 23A, 23B in response to the magnitude of a controlling dc current. Modulating means 19 inputs a modulation signal to the diode controllers 25A,25B so that the controllers modulate the resulting optical beam 18. This is commonly accomplished by modulating the controlling dc current. In addition, an automatic gain control 33 adjusts the amplitude of the generated optical beam 18 in response to the amplitude of the reflected optical beam 22. The automatic gain control 33 will be explained in detail in reference to FIG. 6. The laser diodes 23A,23B output optical signals to a laser power summer 27, which combines the outputs and sends the optical beam 18 to the surface 12. The weld torch, not shown, moves the sensor head along the weld groove. A transmit galvanometer 29, which is driven by a first galvanometer driver 31, scans the generated optical beam 18 at a first predetermined rate in a predetermined path on the surface 12. Other methods of scanning the optical beam, such as acoustic modulation, may be used for this purpose.

The receiving means 20 scans across the predetermined path at a second predetermined rate, preferably greater than the first predetermined rate. A receive galvanometer 35, which is driven by a second galvanometer driver 37, scans across the predetermined path, however other methods may be employed. An optical filter 39, typically a bandpass filter, substantially rejects radiation from the surface 12 which does not have the optical wavelength of the generated optical beam 18.

Figure 2:
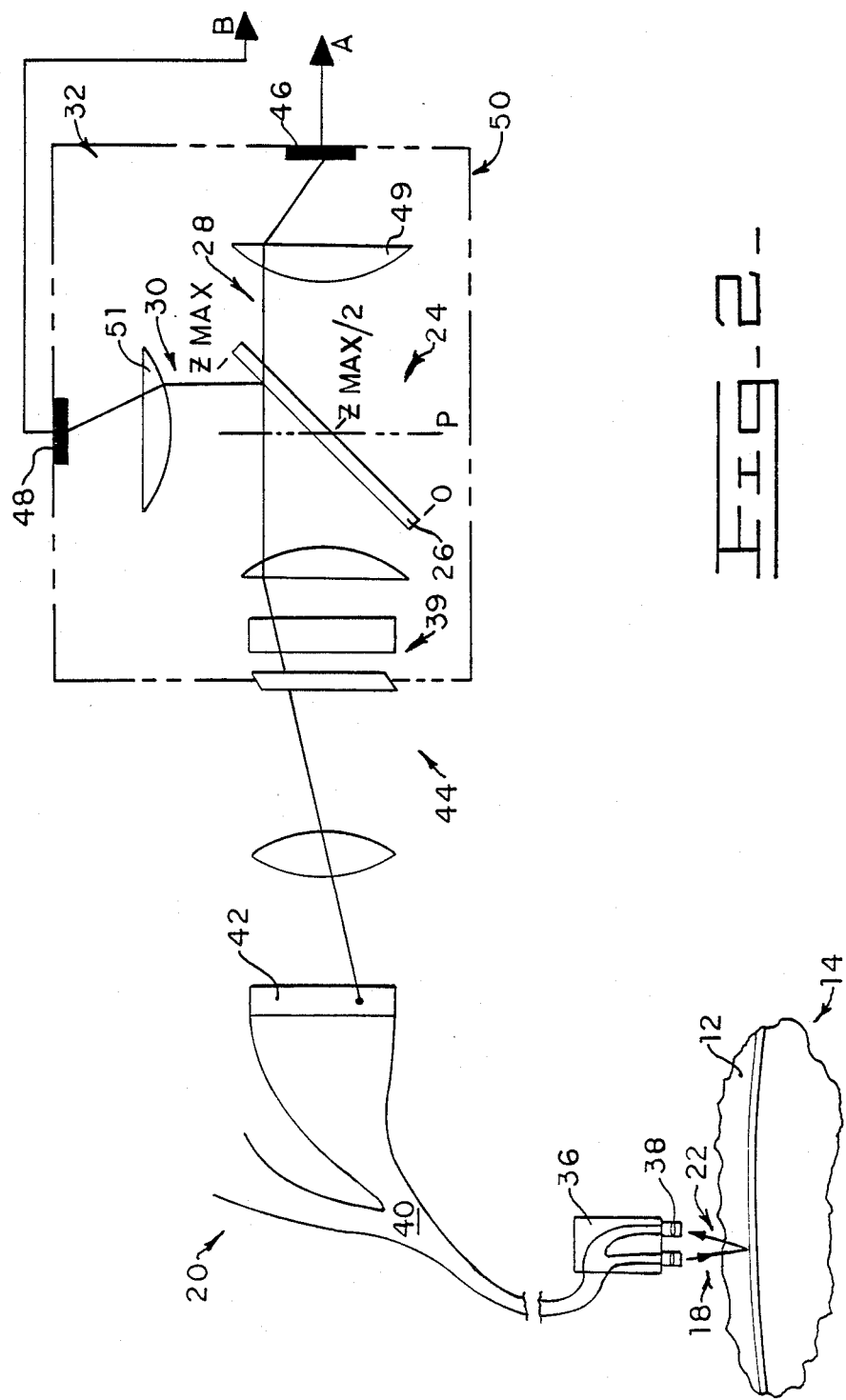
FIG. 2 illustrates a preferred embodiment of an optical detector.

FIG. 2 illustrates a preferred embodiment of an optical detector 47 for use in a system for determining profile information from the surface 12 of an object 14. A means 20 receives a reflected optical beam 22 from the surface 12. A means 24, preferably a variable beam splitter 26, splits the reflected optical beam 22 into a first portion 28 and a second portion 30. An optical detecting means 32 produces a first and second signal in response to the magnitude of the first beam portion 28 and the second beam portion 30, respectively. A processing means 34 determines the profile of the surface 12 in response to the respective magnitudes of successive first and second signals.

The receiving means 20 preferably includes a sensor head 36 having a receiving lens 38. A fiber optic bundle 40 transmits the reflected optical beam 22 to the splitting means 24. The end of the fiber optic bundle forms an image plane 42. The position of the reflected beam 22 on the image plane 42 depends on the instantaneous height of the surface 12. As the height changes, the angle of reflection changes, and the position of the reflected beam 22 changes accordingly.

The splitting means 24 splits the reflected beam 22 into two portions 28,30. Advantageously, a lens arrangement 44 focuses the reflected beam 22 onto the splitting means 24, shown here to preferably be a variable beam splitter 26. Preferably, the lens arrangement 44 focuses light onto a plane P extending through the center of the variable beam splitter 26. The simple lens arrangement 44 shown does not automatically adjust its focal length, so by choosing its focal length to correspond to the center of the variable beam splitter 26 the reflected optical beam 22 is precisely focused in the center while being slightly out of focus at either end. Alternatively, a lens arrangement could focus the reflected optical beam 22 directly onto the variable beam splitter 26 in order to achieve a more precise location which should improve accuracy. The magnitudes of the first and second portions 28, 30 depend on the location of the reflected beam 22 on the variable beam splitter 26. A variable beam splitter 26 absorbs a portion of the reflected optical beam 22, passes a first portion 28, and reflects a second portion 30. FIG. 3 shows typical reflection/transmission r,t properties of a variable beam splitter 26. Since the absorption is substantially constant along the variable beam splitter 26, it responds nearly linearly. As the reflected optical beam 22 changes location on the variable beam splitter 26, from Z=0 to Z=Zmax for instance, the passed first portion 28 decreases in magnitude, while the reflected second portion 30 increases in magnitude.

An optical detecting means 32 produces a first signal and a second signal in response to the magnitude of the first portion 28 and the second portion 30, respectively. As can be interpreted from FIG. 3, the magnitudes of the first and second signals indicate the position of the reflected optical beam 22 on the variable beam splitter 26. Preferably, a first optical detector 46 and a second optical detector 48 are used with the variable beam splitter 26 to receive the first portion 28 and the second portion 30, respectively. Typically, the first and second optical detectors 46,48 produce a current proportional to the intensity of the received radiation. The types of optical detectors used may vary depending on the type of beam emitted from the optical beam source 16. For instance, photodiodes are good detectors of near infrared radiation, while photomultipliers may be a better choice for shorter wavelength radiation. Preferably, a first lens 49 focuses the first beam portion 28 onto the first detector 46, and a second lens 51 focuses the second beam portion onto the second detector 48. This allows the optical detectors 46,48 to receive substantially all of the radiation from the respective portions 28,30 of the reflected beam 22. Since the outputs of the detectors are summed by the processing means 34, accuracy is increased by ensuring that substantially all of the radiation from the respective portions 28,30 is received by the optical detectors 46,48. To further increase accuracy, an enclosure 50 may be disposed about the splitting means 24 and the optical detecting means 32 to prevent spurious radiation from contaminating the reflected optical beam 22.

A processing means 34 determines the profile of the surface 12 in response to the magnitudes of successive first and second signals. A preferred embodiment of a portion of the processing means 34 is shown as a functional block diagram in FIG. 4. The processing means 34 determines the position of the reflected optical beam 22 on the variable beam splitter 26 in response to the magnitude of the first and second signals on lines A and B, respectively. By taking successive readings of the position, while scanning the beam across the surface 12, a profile of the surface 12 is developed.

First and second amplifiers 52, 54 and first and second filters 56, 58 further increase the accuracy of the first and second signals, respectively. The first and second signals are summed together to determine the total intensity of the reflected optical beam 22. The difference of the first and second signals is determined and divided by the sum of the first and second signals to derive a beam position signal. The beam position signal contains information regarding the position of the reflected optical beam 22 on the variable beam splitter 26. If the lens arrangement 44 linearly transmits the reflected optical beam 22 to the variable beam splitter 26, then with no further calculations, the position of the reflected optical beam 22 on the image plane 42 is known. The processing means 34 determines the profile of the surface 12 in response to successive beam position signals. The processing means 34 usually includes a computer or microprocessor 66 for determining the profile in response to successive beam position signals.

Figure 5:
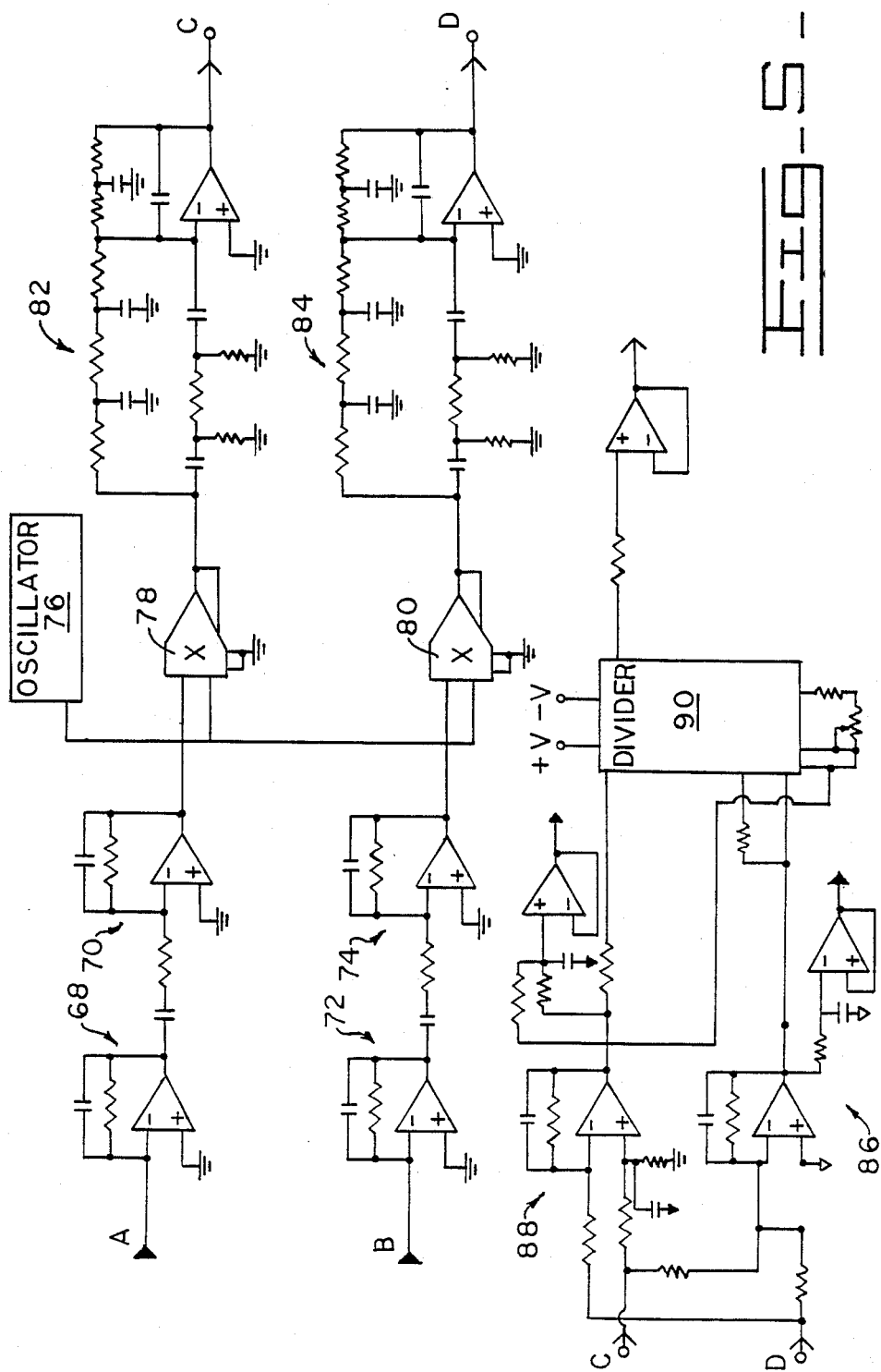
FIG. 5 is a schematic diagram of preferred circuitry associated with the optical sensor.

FIG. 5 is a schematic diagram of preferred circuitry used in the processing means 34. Only a brief description of the circuitry will be given since the design of the individual components is known to those skilled in the art. It is recognized that many variations to the circuit are possible without departing from the spirit and scope of the present invention. The first and second signals are received on lines A and B, respectively. Consecutive inverting operational amplifiers 68,70 associated with line A and consecutive inverting operational amplifiers 72,74 associated with line B amplify the first and second signals, respectively. An oscillator 76 provides a demodulation frequency signal. First and second multipliers 78,80 receive the first and second signals, and use the demodulation frequency signal to demodulate the first and second signals. First and second filters 82,84 filter the demodulated first and second signals. The filters 82,84 shown here are multiple pole, low pass filters. They reject unwanted signal components at the modulation frequency and harmonics thereof, and average the first and second signals to further reduce noise. The first and second signals are then passed to a summing stage 86 and to a subtracting stage 88. The summing stage 86 sums the first and second signals, and the subtracting stage 88 subtracts the second signal from the first signal. A divider 90 divides the difference of the first and second signals by the sum of the first and second signals to produce a beam position signal. The following equation mathematically describes the position of the reflected beam 22 on the variable beam splitter 26.

$$Zp = (F-S)/(F+S)$$

where: p1 Zp is the position on the variable beam splitter 26;
F is the magnitude of the first signal; and
S is the magnitude of the second signal.

Figure 6:
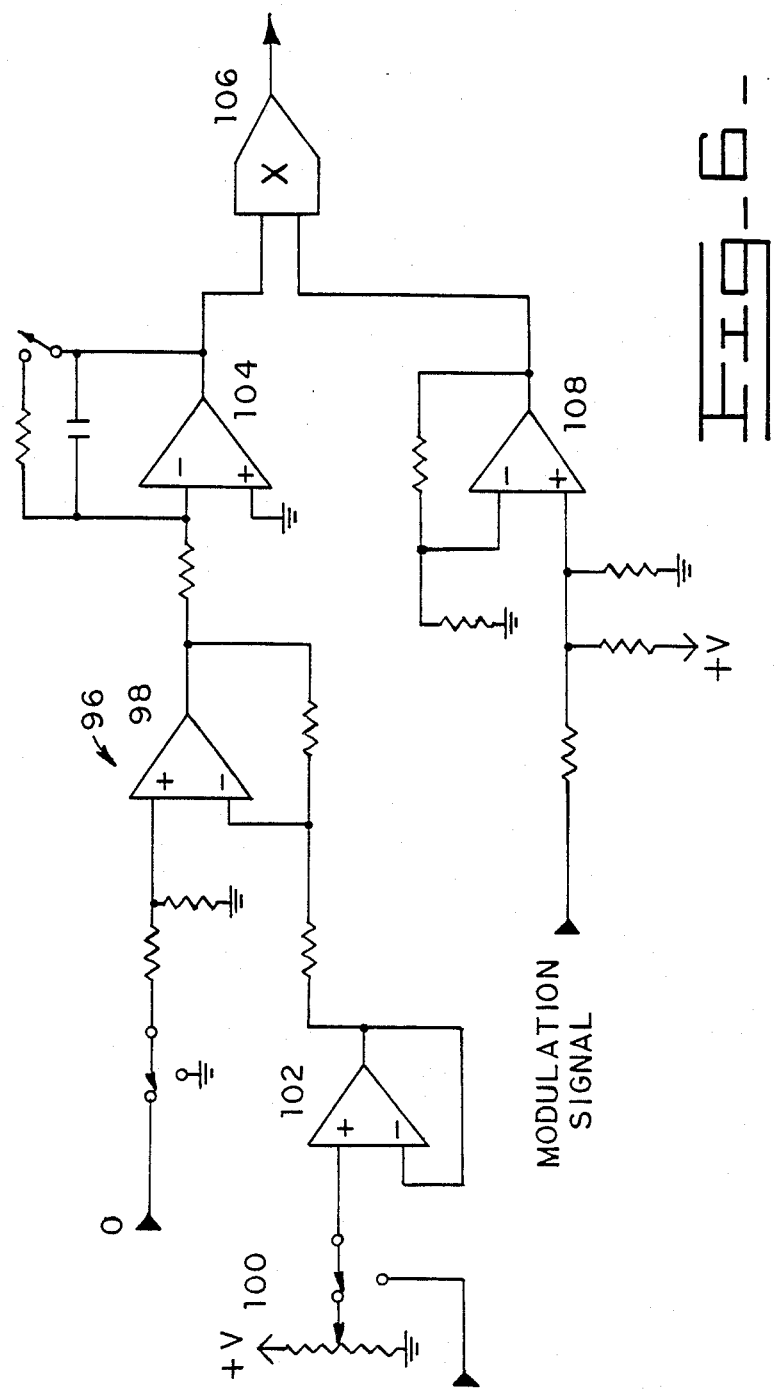
FIG. 6 is a schematic diagram of preferred circuitry associated with an automatic gain control.

FIG. 6 is a schematic diagram of preferred circuitry associated with the automatic gain control 33. The automatic gain control 33 may be used with the system 10 or many other types of optical systems. The optical detecting means 32 produces a feedback signal in response to the magnitude of the reflected optical beam 22. The goal of automatic gain control is to regulate the magnitude; i.e., power, of the reflected optical beam 22. If the magnitude of the reflected optical beam is kept constant, the accuracy and signal-to-noise ratio of the system 10 improves and fewer signal dropouts are encountered.

In the system as shown, the feedback signal is the sum of the first and second signals, and is received on the line O. A means 96, shown here to be a subtracting amplifier 98, compares the feedback signal with a preselected setpoint signal to produce a control signal. The preselected setpoint signal may be generated, for instance, by the processing means 34 or by a potentiometer 100, and is delivered via a buffer 102. The preselected setpoint signal is equivalent to the desired magnitude of the reflected optical beam 22. The feedback and preselected setpoint signals are compared such that, if they are equivalent, the control signal output from the comparing means is zero. An integrator 104 receives the control signal. If the control signal is positive, the integrator 104 outputs a negatively sloped signal. This indicates a condition where the feedback signal is greater than the preselected setpoint signal, so the magnitude of the generated optical beam should be reduced. Conversely, if the control signal is negative, the integrator outputs a positively sloped signal. This indicates a condition where the feedback signal is less than the preselected setpoint signal, so the magnitude of the generated optical beam should be increased. Multiplier 106 receives the output from the integrator 104 and a modulation signal, such as a 5K Hz sine wave, from a summing operational amplifier 108. In this particular circuit, the oscillator 76 supplies a modulation frequency to the operational amplifier 108. The output signal from the integrator is modulated by multiplier 106, and delivered to the laser diode controllers 25A,25B. As previously discussed, the laser diode controllers 25A,25B incorporate the output signal from the automatic gain control 33 to adjust the power of the generated optical beam 18, such that the power of the received optical beam 22 remains substantially constant.

INDUSTRIAL APPLICABILITY

In a welding application, typically a means scans the generated optical beam at a first preselected rate along a predetermined path across a weld groove. The predetermined path is usually an axis, y, running along the surface 12 perpendicular to the groove 43. The welding machine moves along the groove 43 slowly relative to the first preselected rate. The receiving means 20 scans across the predetermined path at a second predetermined rate, usually greater than the first predetermined rate. Therefore, any variations in the angle of reflection are due to changes in surface height z, i.e. surface profile. Hence, the positional information of the beam in one axis is all that is needed to determine the profile of the surface. It will be appreciated that systems requiring two axis information can easily be implemented using the present system and accordingly would fall within the scope of the present invention.

Since the angle between the generated optical beam 18 and the receiving means is known, principles of triangulation are used to determine the profile of the surface. Therefore, any deviation in the reflected optical beam 22 is measured to determine the profile of the surface 12. The present system uses a splitting means 24 and optical detecting means. 32 to measure the position of the reflected optical beam 22 in order to determine the surface profile. The reflected optical beam 22 received by the receiving means 20 is preferably focused onto a variable beam splitter 26. The variable beam splitter 26 splits the reflected optical beam into a first portion 28 and a second portion 30. The reflective and transmissive properties of a variable beam splitter 26 depends upon the position of the radiation. The magnitudes of the first and second portions 28,30 are correlative to the location that the reflected optical beam 22 strikes on the variable beam splitter 26. First and second lenses 49,51 focus the first and second portions 28,30 onto first and second optical detectors 46,48, respectively. The first and second optical detectors 46,48 produce respective first and second signals having magnitudes correlative to the magnitudes of the first and second beam portions 28,30.

The first and second signals are processed to give an indication of the position of the reflected optical beam. Successive beam positions determine a surface profile. A processing means 34 receives the first and second signals. The total reflective magnitude of the reflected optical beam is determined by adding the first and second signals. The position of the optical beam on the variable beam splitter 26 is determined by subtracting the second signal from the first signal, and dividing the difference by the sum of the first and second signals to derive a beam position signal. Successive beam position signals for a particular scan are stored to determine a surface profile. Peripheral control circuits use the information in the profile to control various weld parameters such as welder speed and position, and fill control.

The sum of the first and second signals is used as a feedback signal for the optical beam source 16. An automatic gain control 33 receives the feedback signal, which corresponds to the reflectivity of the surface 12. Ideally, the magnitude of the reflected optical beam 22 should remain constant to enhance the dynamic range of the optical system 10. The automatic gain control 33 alters the magnitude of the generated optical beam 18 in response to surface reflectivity to maintain a constant magnitude of the reflected optical beam 22. The feedback signal is compared to a preselected setpoint signal to produce a control signal. The preselected setpoint signal corresponds to the desired magnitude of the reflected optical beam 22. A difference between the compared signals indicates a change in reflectivity of the surface 12, so the magnitude of the generated optical beam 18 is altered to compensate for the reflectivity change. An integrator 104 receives the control signal, and produces a signal having a positive slope in response to the feedback signal being less than the preselected setpoint signal, or a negative slope in response to the feedback signal being greater than the preselected setpoint signal. The integrator output signal is modulated by a multiplier 106 and delivered, in this case, to the diode controllers 25A,25B. The diode controllers 25A,25B use the feedback to control the magnitude of the generated optical beam 18.

Other aspects, objects, and advantages of the present invention can be obtained from a study of the specification, the drawings, and the appended claims.

I claim:

1. A system for determining profile information from the surface of an object, comprising:
    an optical beam source for generating an optical beam for application to the surface;
    means for receiving a reflected optical beam from the surface;
    means for splitting said received reflected optical beam into a first portion and a second portion;
    optical detecting means for producing a first signal and a second signal in response to the magnitude of said first portion and said second portion, respectively; and
    processing means for determining the profile of said surface in response to the respective magnitudes of successive first and second signals wherein said processing means divides a difference of the first and second signals by the sum of the first and second signals to derive a beam position signal.
2. The system, as set forth in claim 1, wherein said receiving means includes a fiber optic bundle.

3. The system, as set forth in claim 1, wherein said splitting means includes a variable beam splitter.

4. The system, as set forth in claim 3, wherein the magnitude of the first and second portions are responsive to location of the reflected beam on said variable beam splitter.

5. The system, as set forth in claim 3, further comprising a lens arrangement for focusing said reflected optical beam onto said variable beam splitter.

6. The system, as set forth in claim 1, wherein said optical detecting means includes a first optical detector for receiving said first beam portion, and a second optical detector for receiving said second beam portion.

7. The system, as set forth in claim 6, wherein said optical detecting means includes a first lens adapted to focus said first beam portion onto said first optical detector, and a second lens adapted to focus said second beam portion onto said second optical detector.

8. The system, as set forth in claim 1, wherein said processing means determines the profile of the surface in response to successive beam position signals.

9. The system, as set forth in claim 1, further comprising:
means for scanning said generated optical beam in a predefined path along the surface at a first preselected rate.

10. The system, as set forth in claim 9, wherein said receiving means scans across said predefined path at a second preselected rate.

11. The system, as set forth in claim 10, wherein said second preselected rate is greater than said first preselected rate.

12. The system, as set forth in claim 1, further comprising:
means for automatically controlling the gain of said generated optical beam in response to the magnitude of said received reflected optical beam.

13. The system, as set forth in claim 12, wherein said automatic gain control means sums said first portion with said second portion, and delivers a feedback signal having a magnitude correlative to said sum.

14. The system, as set forth in claim 13, wherein said feedback signal is compared to a preselected setpoint signal to produce a control signal.

15. The system, as set forth in claim 14, further comprising means for altering the magnitude of said generated optical beam in response to said control signal.

16. A system for determining profile information from the surface of an object, comprising:
an optical beam source for generating an optical beam for application to the surface;
means for receiving a reflected optical beam from the surface, and applying the reflected optical beam onto an image plane;
a variable beam splitter being adapted to receive the reflected optical beam from the image plane and pass a first portion of said beam and reflect a second portion of said beam;
optical detecting means for producing a first signal and a second signal in response to the magnitude of said first portion and said second portion, respectively; and
processing means for determining the position of said reflected optical beam on said variable beam splitter in response to said first and second signals wherein said processing means divides a difference of the first and second signals by the sum of the first and second signals to derive a beam position signal.

17. The system, as set forth in claim 16, where in said receiving means includes a fiber optic bundle.

18. The system, as set forth in claim 16, wherein the magnitude of the first and second portions are responsive to location of the reflected beam on said variable beam splitter.

19. The system, as set forth in claim 16, wherein said optical detecting means includes a first optical detector for receiving said first beam portion, and a second optical detector for receiving said second beam portion.

20. The system, as set forth in claim 19, wherein said optical detecting means includes a first lens adapted to focus said first beam portion onto said first optical detector, and a second lens adapted to focus said second beam portion onto said second optical detector.

21. The system, as set forth in claim 16, further comprising a lens arrangement for focusing said reflected optical beam onto said variable beam splitter.

22. The system, as set forth in claim 16, wherein said processing means includes:
means for determining the profile of the surface in response to successive beam position signals.

23. The system, as set forth in claim 16, further comprising:
means for scanning said generated optical beam in a predefined path along the surface at a first preselected rate.

24. The system, as set forth in claim 23, wherein said receiving means scans across said predefined path at a second preselected rate.

25. The system, as set forth in claim 24, wherein said second preselected rate is greater than said first preselected rate.

26. The system, as set forth in claim 16, further comprising:
means for automatically controlling the gain of said generated optical beam in response to the magnitude of said received reflected optical beam.

27. The system, as set forth in claim 26, wherein said automatic gain control means sums said first portion with said second portion, and delivers a feedback signal having a magnitude correlative to said sum.

28. The system, as set forth in claim 27, wherein said feedback signal is compared to a preselected setpoint signal to produce a control signal.

29. The system, as set forth in claim 28, further comprising means for altering the magnitude of said generated optical beam in response to said control signal.

* * * * *